US008667483B2

(12) United States Patent
Coussemaeker et al.

(10) Patent No.: US 8,667,483 B2
(45) Date of Patent: Mar. 4, 2014

(54) DEVICE DEPENDENT ON-DEMAND COMPILING AND DEPLOYMENT OF MOBILE APPLICATIONS

(75) Inventors: Didier Coussemaeker, Seattle, WA (US); Danny Lange, Sammamish, WA (US); Joe Futty, Sammamish, WA (US); Ashley Nathan Feniello, Woodinville, WA (US); Graham Arthur Wheeler, Redmond, WA (US); Adrien Felon, Seattle, WA (US); Nicolas Mai, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 12/410,987

(22) Filed: Mar. 25, 2009

(65) Prior Publication Data

US 2010/0251231 A1    Sep. 30, 2010

(51) Int. Cl.
*G06F 9/445*    (2006.01)
(52) U.S. Cl.
USPC ........... 717/174; 717/175; 717/176; 717/177; 717/178
(58) Field of Classification Search
None
See application file for complete search history.

(56) References Cited

U.S. PATENT DOCUMENTS

| | | | |
|---|---|---|---|
| 6,108,712 A | | 8/2000 | Hayes, Jr. |
| 6,272,674 B1 * | | 8/2001 | Holiday, Jr. ................... 717/174 |
| 6,279,030 B1 | | 8/2001 | Britton et al. |
| 6,418,554 B1 * | | 7/2002 | Delo et al. .................... 717/174 |
| 6,496,979 B1 | | 12/2002 | Chen et al. |
| 6,609,150 B2 | | 8/2003 | Lee et al. |
| 7,073,172 B2 * | | 7/2006 | Chamberlain ................ 717/169 |
| 7,181,731 B2 * | | 2/2007 | Pace et al. ..................... 717/136 |
| 7,308,462 B1 * | | 12/2007 | Clarkson et al. ..................... 1/1 |
| 7,363,035 B2 | | 4/2008 | Reilly |
| 7,383,535 B1 | | 6/2008 | Kshetrapal et al. |
| 7,430,610 B2 * | | 9/2008 | Pace et al. ..................... 709/233 |
| 7,685,577 B2 * | | 3/2010 | Pace et al. ..................... 717/136 |
| 7,954,098 B1 * | | 5/2011 | Martin et al. .................. 717/176 |
| 7,970,923 B2 * | | 6/2011 | Pedersen et al. .............. 709/231 |
| 2002/0016166 A1 * | | 2/2002 | Uchida et al. .................. 455/419 |
| 2002/0112232 A1 * | | 8/2002 | Ream et al. .................... 717/176 |

(Continued)

FOREIGN PATENT DOCUMENTS

WO    WO-2008055302    5/2008
WO    2008084397 A1    7/2008

OTHER PUBLICATIONS

"International Search Report", Mailed Date: Nov. 29, 2010, Application No. PCT/US2010/028032, Filed Date: Mar. 19, 2010, pp. 12.

(Continued)

*Primary Examiner* — Chameli Das
(74) *Attorney, Agent, or Firm* — Steve Wight; Carole Boelitz; Micky Minhas

(57) ABSTRACT

To accommodate different types and versions of execution environments on mobile devices, requests for applications from a programmable device, such as a smart phone or other mobile device include status data about the characteristics of the device. Information about the display, memory, storage, and/or script engine may be forwarded with a request. At a fulfillment server, the information is evaluated so that an appropriately versioned and configured application can be custom built, or selected from a pre-built inventory of applications. This allows a user to postpone an upgrade and still receive appropriate versions of executable, optimized to the particular mobile device.

21 Claims, 6 Drawing Sheets

(56) References Cited

U.S. PATENT DOCUMENTS

| | | |
|---|---|---|
| 2002/0129126 A1 | 9/2002 | Chu et al. |
| 2003/0041110 A1* | 2/2003 | Wenocur et al. ............ 709/206 |
| 2003/0051236 A1* | 3/2003 | Pace et al. .................. 717/177 |
| 2003/0181196 A1 | 9/2003 | Davidov et al. |
| 2004/0133848 A1 | 7/2004 | Hunt et al. |
| 2004/0158577 A1* | 8/2004 | Chu et al. ................. 707/103 R |
| 2004/0181790 A1* | 9/2004 | Herrick ....................... 717/168 |
| 2005/0086654 A1* | 4/2005 | Sumi et al. .................. 717/171 |
| 2005/0108690 A1 | 5/2005 | Lau et al. |
| 2006/0031529 A1 | 2/2006 | Keith |
| 2006/0059458 A1 | 3/2006 | Plummer |
| 2006/0080659 A1 | 4/2006 | Ganji |
| 2006/0242464 A1* | 10/2006 | Holt .............................. 714/25 |
| 2006/0265705 A1* | 11/2006 | Holt ............................ 717/169 |
| 2007/0011669 A1* | 1/2007 | Varma et al. ................. 717/168 |
| 2007/0033587 A1* | 2/2007 | Siebrecht .................... 717/174 |
| 2008/0127136 A1* | 5/2008 | Hino et al. ................... 717/140 |
| 2008/0222589 A1* | 9/2008 | Banerjee ........................ 716/11 |
| 2008/0295092 A1* | 11/2008 | Tan et al. ..................... 717/178 |
| 2009/0007160 A1 | 1/2009 | Wei |
| 2009/0019423 A1* | 1/2009 | Halter et al. ................. 717/114 |
| 2009/0070754 A1* | 3/2009 | Ichikawa ..................... 717/168 |
| 2009/0300596 A1* | 12/2009 | Tyhurst et al. ............... 717/173 |
| 2010/0037216 A1* | 2/2010 | Carcerano et al. ........... 717/173 |
| 2010/0159912 A1* | 6/2010 | Lee et al. ..................... 455/419 |
| 2010/0281112 A1* | 11/2010 | Plamondon ................. 709/203 |
| 2010/0299647 A1* | 11/2010 | Hakewill et al. ............. 716/111 |

OTHER PUBLICATIONS

Rajapaske, D., "Fragmentation of Mobile Applications," Apr. 2008, http://www.comp.nus.edu.sg/~damithch/df/device-fragmentation.htm.

Montanari et al., "Policy-Based Dynamic Reconfiguration of Mobile-Code Applications," Jul. 2004, IEEE Computer Society, http://ieeexplore.ieee.org/ielx5/2/29084/01310243.pdf?arnumber=1310243.

Chen et al., "Studying Energy Trade Offs in Offloading Computation/Compilation in Java-Enabled Mobile Devices," 2004, IEEE Computer Society, http://ieeexplore.ieee.org/ielx5/71/29444/01333651.pdf?arnumber=1333651.

EP Patent Application 10756648.1; Extended European Search Report dated Mar. 27, 2013; 7 pages.

CN Notice on the First Office Action for Application No. 201080014025.7, Jun. 20, 2013.

\* cited by examiner

DEVICE DEPENDENT ON-DEMAND COMPILING AND DEPLOYMENT OF MOBILE APPLICATIONS

BACKGROUND

Electronic devices, particularly hand-held or other mobile devices are increasingly becoming a part of everyday life and are often displacing many functions formerly reserved for portable or even desktop computers. Much of this new functionality derives from the ability of the mobile devices to download and run application programs, in some instances, called applets. These application programs are typically executed on small virtual machines or script engines. The proliferation of mobile devices with an almost infinite variety of memory, displays, cameras, keyboards/touch screens, and especially processors and their associated script engines has made it difficult to maintain application compatibility over this wide range of execution environments.

SUMMARY

Since applications built for such a mobile, programmable device may be more specialized to the particular environment and may be sensitive to even the version of the script engine supporting execution of such applications, users may choose to remain on a previous version of the script engine, even when a newer version is available. Similarly, a version or type of peripheral, such as a camera or wireless interface may have version dependencies on particular application releases or script engine versions.

A compiler with an intelligent front end can receive information about a particular mobile device platform and compile a version of an application program for that particular environment that not only optimizes the application for the type and version of the script engine available but also customizes features considering the memory and peripherals available. The request from a mobile device for an application may include execution environment details including accessories, such as camera type/resolution, memory size and speed, script engine type and version, display resolution, etc. The front end can set compiler directives or custom include files to optimize the compilation process for an optimal executable for requesting platform. Some embodiments may pre-compile application variations for the most common target environments.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
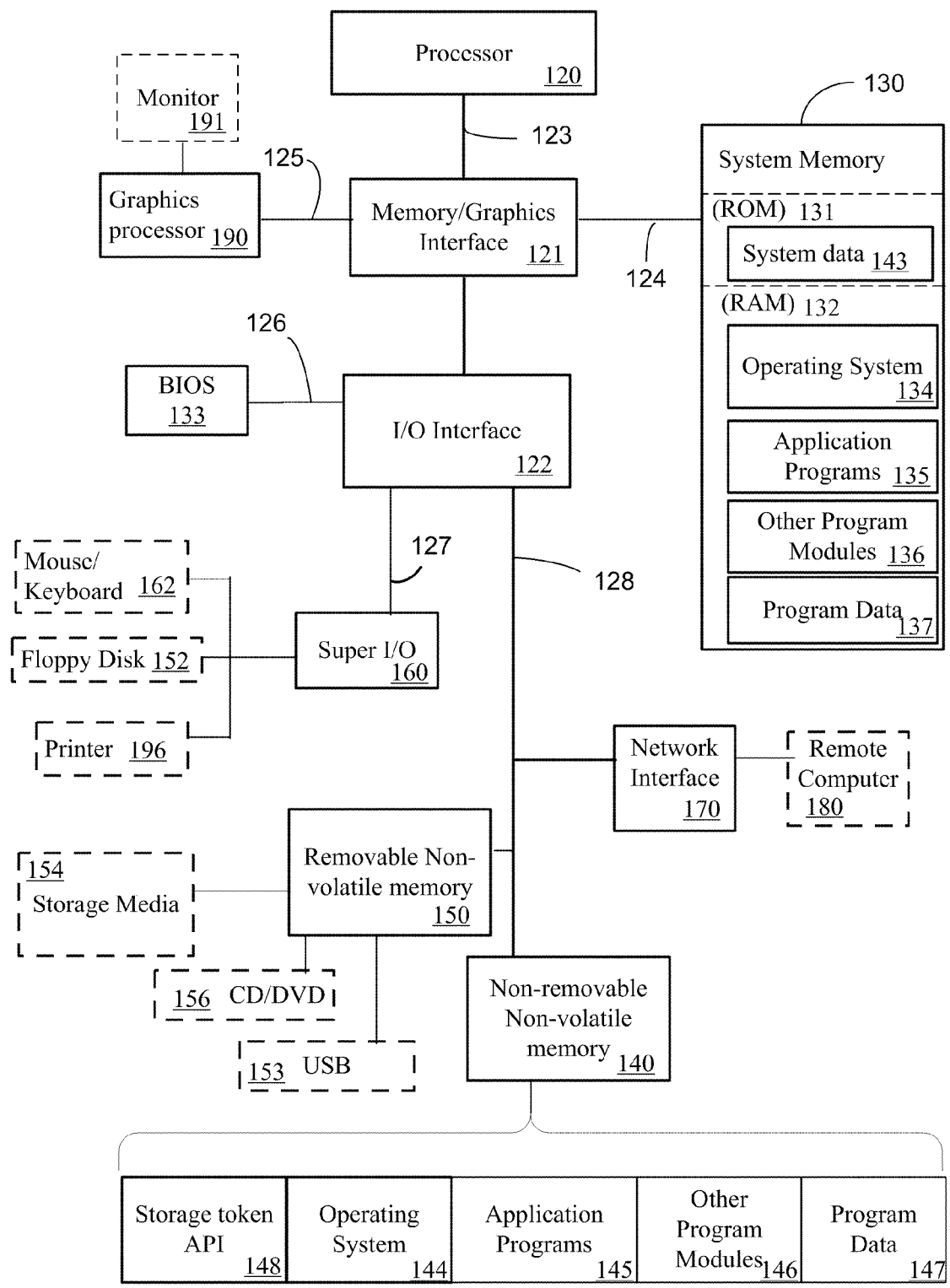
FIG. 1 is a block diagram of computer.

With reference to FIG. 1, an exemplary system for implementing the claimed method and apparatus includes a general purpose computing device in the form of a computer 110. While the programmable device described in more detail below may typically be a handheld or portable computing/communication device, it may be a computer as illustrated here. The computer 110 may also represent a typical server as described below for use in fulfilling requests from a programmable device. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks (DVD), digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
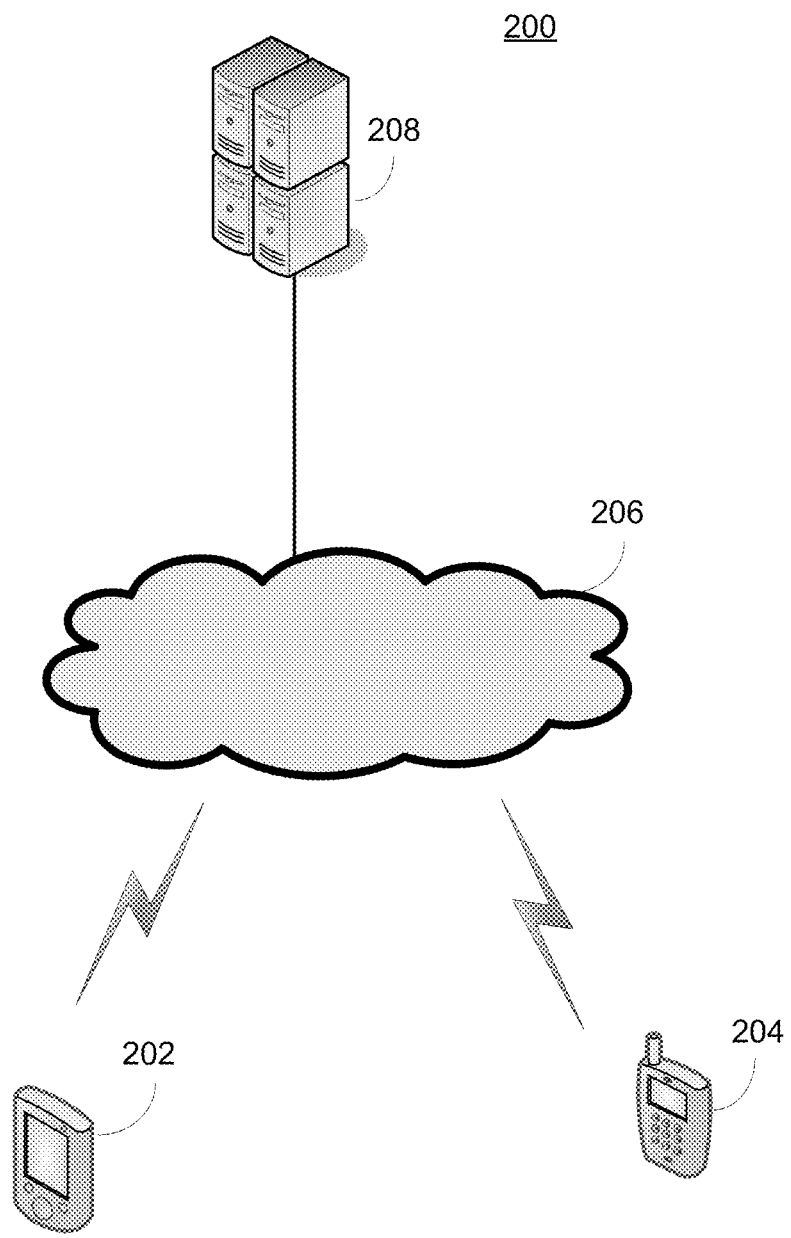
FIG. 2 is a block diagram of a system supporting on-demand compiling and deployment of mobile applications.

FIG. 2 illustrates one embodiment of a system 200 supporting device dependent on-demand compiling and deployment of mobile applications. The system 200 may include first and second programmable devices 202 and 204 respectively. Each of the programmable devices may exhibit some common base configuration items, for example, a color display, a text input capability, 1 Gigabyte (GByte) of non-volatile storage memory, etc. Each device may also have characteristics unique from the other, such as, a larger display area, greater color depth, motion sensors, cameras with different pixel ratings or movie capabilities, etc. Each device 202 and 204 may communicate with a network infrastructure 206, such as the Internet or a corporate Intranet or local area network (LAN) or other public or private network. The communication medium may be wireless, but wired communication would not be uncommon. A server 208 may be connected to the network infrastructure 206. The server 208 may act as a fulfillment center to service application requests from the programmable devices 202 and 204, as described in more detail below.

Figure 3:
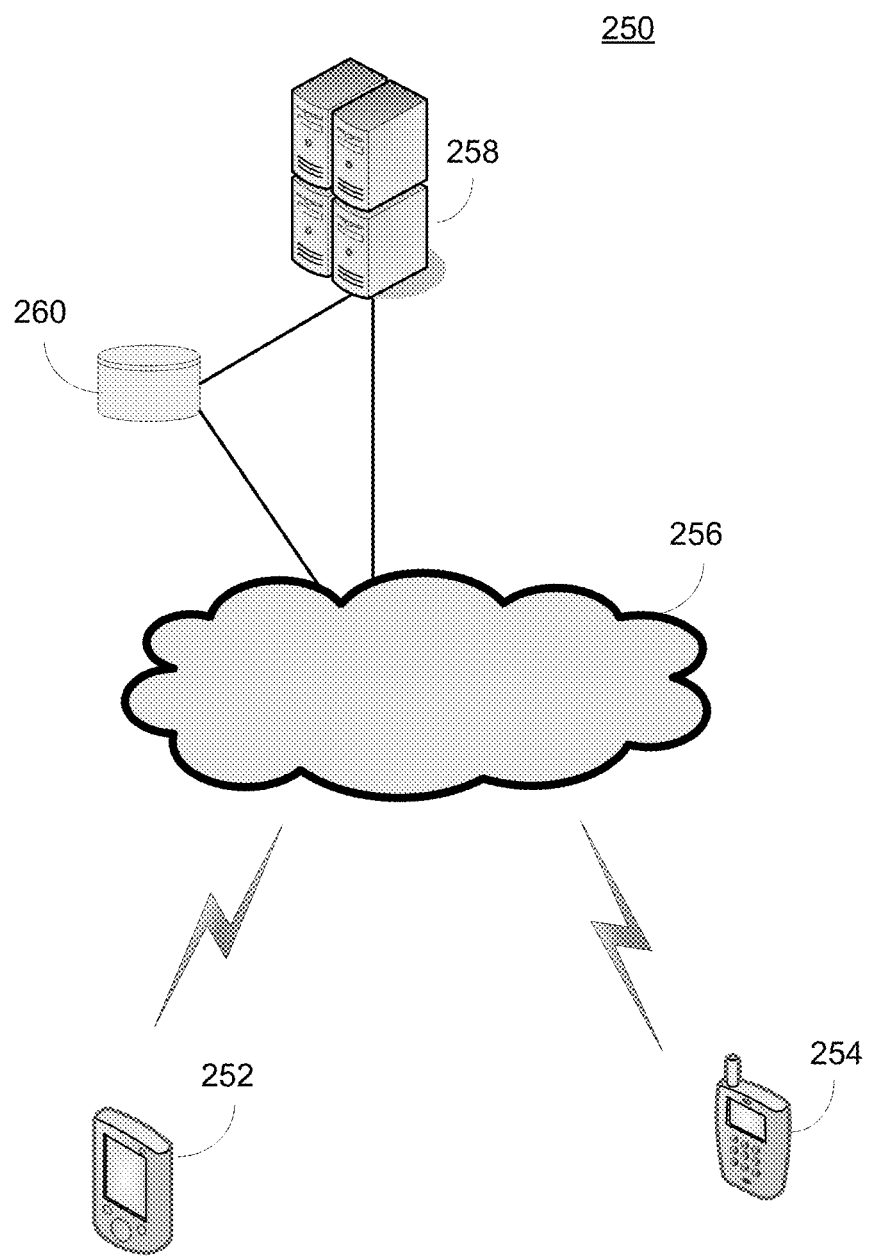
FIG. 3 is a block diagram of another system supporting on-demand compiling and deployment of mobile applications.

FIG. 3 illustrates another embodiment of a system 250 supporting device dependent on-demand compiling and deployment of mobile applications. The system 250 may include first and second programmable devices 252 and 254, respectively. As above, each of the programmable devices may exhibit some common base configuration items and unique elements. The programmable devices 252 and 254 may communicate via a network infrastructure 256 with a server 258 and a storage device 260. The network infrastructure 256 may be the Internet, a corporate Intranet or local area network (LAN), or other public or private network. A server 258 may be connected to the network infrastructure 256 and may service application requests from the programmable devices 252 and 254. The storage device 260 may store pre-compiled customized applications for one or more common configurations of programmable devices. For example, some cellular telephone operators may buy a particular model and configuration of device in great quantity and sell or deliver them to a large subscriber population. For users whose needs are met by the standard configuration, a set of pre-compiled applications for that configuration may be stored at storage device 260 and delivered on demand.

Figure 4:
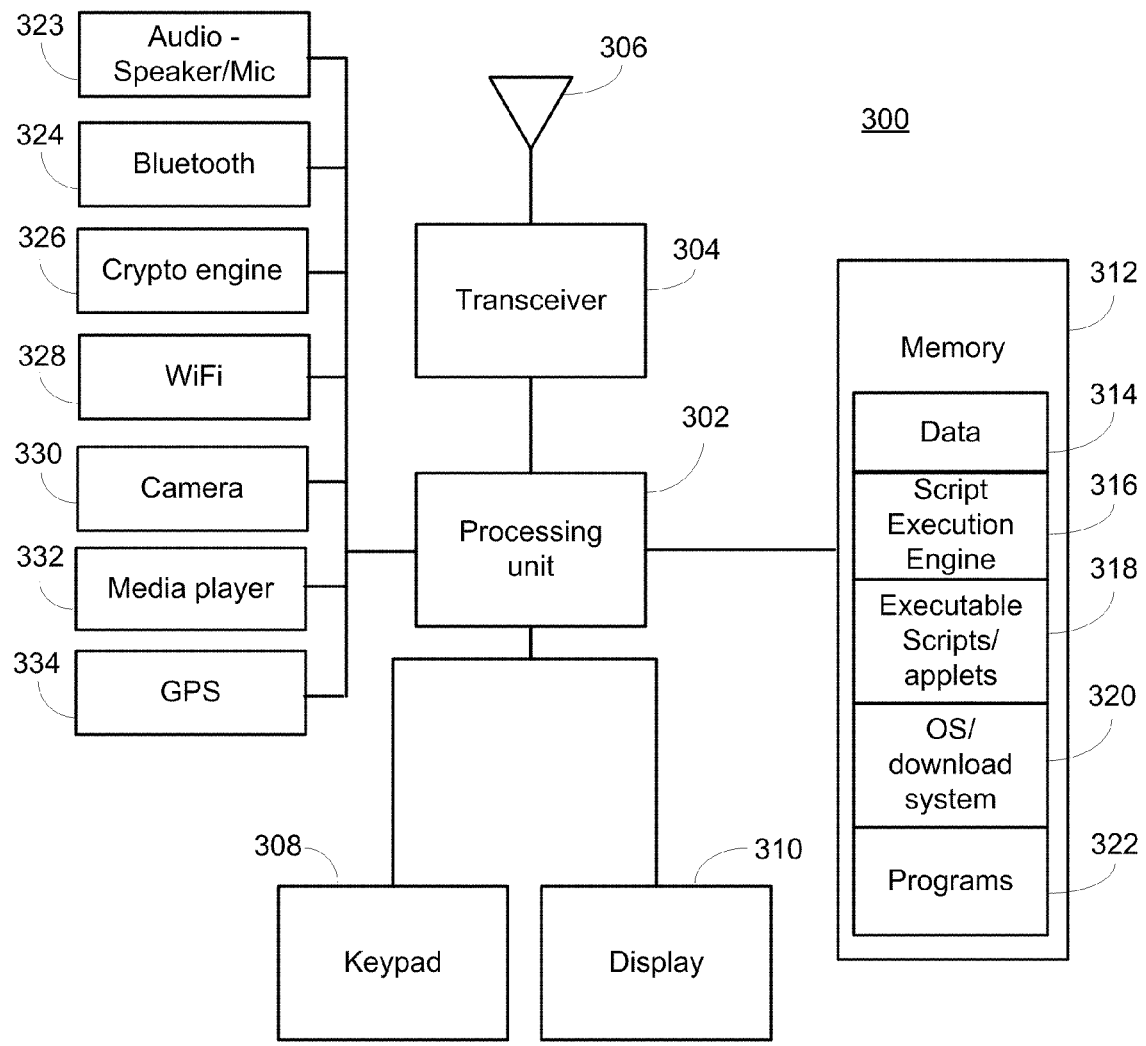
FIG. 4 is a block diagram of a representative programmable device.

FIG. 4 illustrates an exemplary programmable device 300. The programmable device 300 may be a cellular telephone, a smart phone, a personal digital assistant, a Bluetooth™ accessory, or other portable device. The programmable device 300 may also be a computer, such as a laptop, but may be standard desktop or tower computer. The programmable device 300 may be similar to the computer 110 of FIG. 1, or may have a more limited capability platform, but at the same time, may have 'peripherals' that are more integral to the device, such as a built in camera, and display/keypad or touch screen.

The programmable device 300 may include a processing unit 302. The processing unit 302 may be a single chip processor, with volatile and non-volatile memory (not depicted), such as an ARM™ family processor, although other well known processors may also be used. The programmable device 300 may include a transceiver 304 for communication with a host device, such as server 208 of FIG. 2. The transceiver 304 may support wireless communication via antenna 306, although in some embodiments, the transceiver may support wireline communication. In a wireless configuration, the transceiver 304 may support short-range communication, such as Wi-Fi, or may support wide-area communication via a cellular telephone or PCS infrastructure.

A user interface may be supported by a keypad 308 and a display 310. In some embodiments the keypad function may be incorporated in a touchscreen version of the display 310. A memory 312 may include both volatile and nonvolatile memory. The memory 312 may store data 314, such as locally generated information such as telephone numbers as well as downloaded information such as Web pages. The memory 312 may also store executable instructions that implement a script execution engine 316, such as a Java virtual machine or similar execution environment. Executable scripts or applications/applets 318 may be interpreted and/or executed by the script execution engine 316. An operating system 320 including a download manager may be used to support basic functions in the programmable device 300 as well as user interface and communication primitives. Functions of the programmable device 300 may be supported by native or downloaded programs 322, for example, such functions may be associated with dialing a telephone number or power management.

One or more built-in hardware or virtual peripherals may be included in the programmable device 300. Such peripherals may include a Bluetooth wireless capability 324, a cryptographic engine 326, a Wi-Fi transceiver 328 (802.11x), a camera 330, a media player 332, a global positioning satellite (GPS) receiver 334, etc. While some of these peripherals may include hardware, such as the camera, each of the peripherals may have associated applications that support its interface to the programmable device 300 as well as support for its user interface. In some cases, downloaded applications may add new capabilities to an existing device. For example, the media player 332, may be upgraded via a new application to support a new media type, such as a new video format, using the originally installed display 310 and audio circuits 323. The audio circuits 323 may include one or more speakers and one or more microphones.

In operation, the download system 320 may receive a list of qualified applications that are appropriate for execution on the programmable device 300. The list may be pre-loaded on the programmable device 300, but it is expected that the list will be updated over time via the transceiver 304. When a user is interested in obtaining or updating a new application for his or her programmable device 300, a list of the qualified applications may be presented. After the user has made a selection, specific information about the programmable device 300 may be collected by the download system/operating system 320. The specific information may be information regarding the configuration and current state of the programmable device 300, for example, processor type and speed, script engine type and version, screen size and color palette/color depth, input/touchsceen information, motion sensors, etc. The selection and the specific information may be collected and sent to a fulfillment center. When the response with the selected application is received, it is presumably customized to match the specific information sent regarding the programmable device 300. To verify this, information in the download package may be examined to determine if the characteristics associated with the application match the capabilities of the programmable device 300. If they match, the application may be installed and made available to the user. As with other downloaded applications, both integrity and authorization checks may be made before installation or execution of the application.

Figure 5:
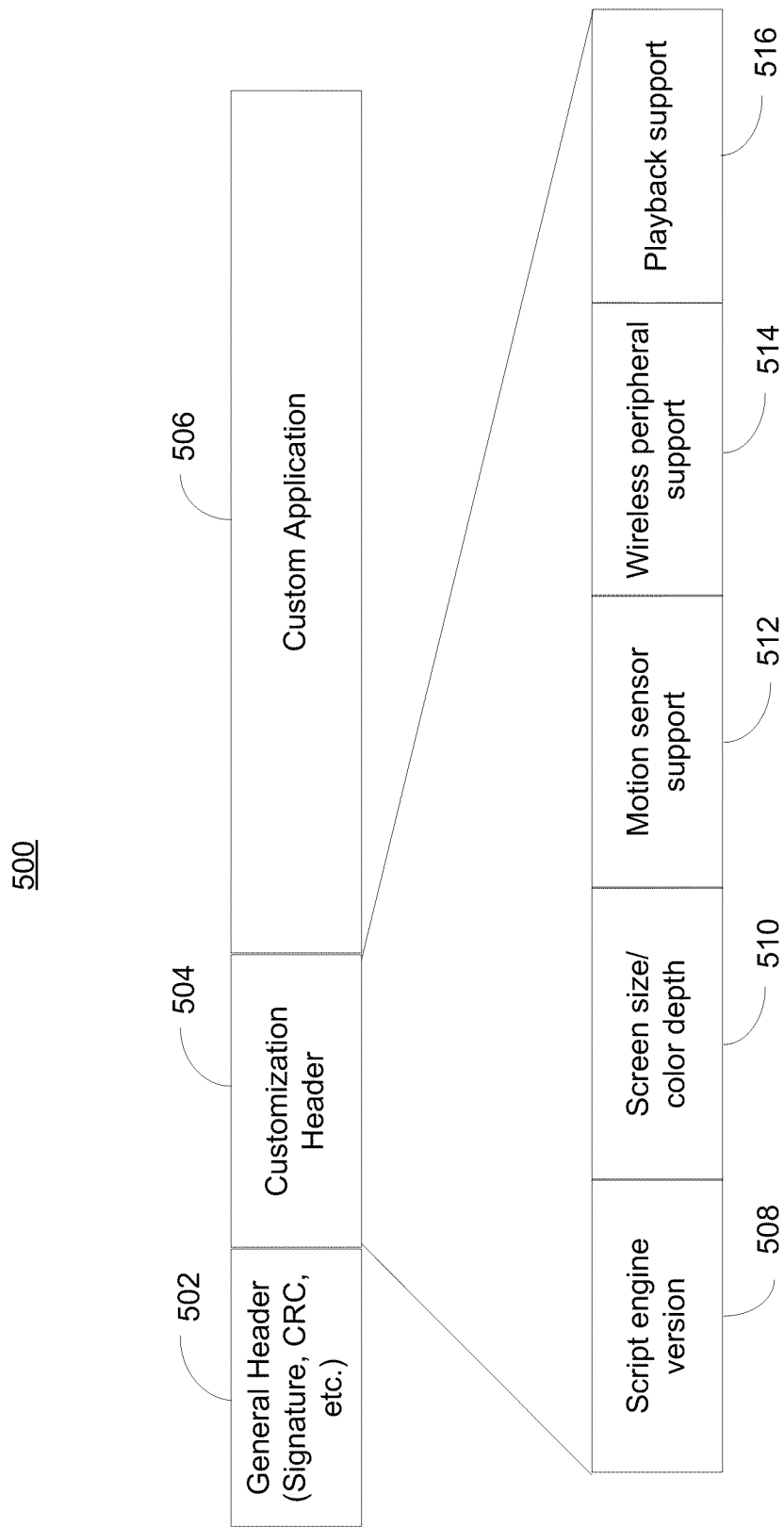
FIG. 5 is a block diagram of an exemplary packet structure.

FIG. 5 illustrates an exemplary packet structure for conveying customized applications. To support the verification of the application by the programmable device 300, information in the packet structure may indicate options for which the application was customized.

The download package 500 may include a general header 502, a customization header 504, and a custom version of the selected application 506. The general header may include generic application identification information, e.g. "bowling 2.0," and may also include a checksum or other integrity check, as well as a digital signature for use in verifying the authenticity of the source. A customization header 504 may also be included to allow the programmable device 300 to verify correctness of the custom application 506 to its own platform capabilities.

The customization header 504 may include, but not be limited to, fields such as a script engine version 508, a screen size/color depth 510, motion sensor support 512, and/or wireless peripheral support 514.

The script engine version 508 may include not only the type of scripting support available (e.g. Java, Flash, Silverlight, etc.) but also the revision or version number of the engine. In some cases, certain applications will only run on script engine versions of a certain level.

The screen size and color depth 410 allow customization of the application to fit the screen and to present picture or video information at it maximum definition. Motion sensor support 512 allows an application 506 to take advantage of vector and acceleration information as inputs to the application 506. Wireless peripheral support 514 allows audio/visual aspects of the operation of the application to be presented to the user in a rich context by taking advantage of such peripherals, or at least customizing the application to support such peripherals.

Other configuration elements that may be checked and reported are hardware and firmware related to media presentation, in general, playback support information 516. Elements of playback support may include media coder/decoders (CODECs), supported file formats, and transport stream formats (e.g. MPEG2, MPEG4, etc.).

Figure 6:
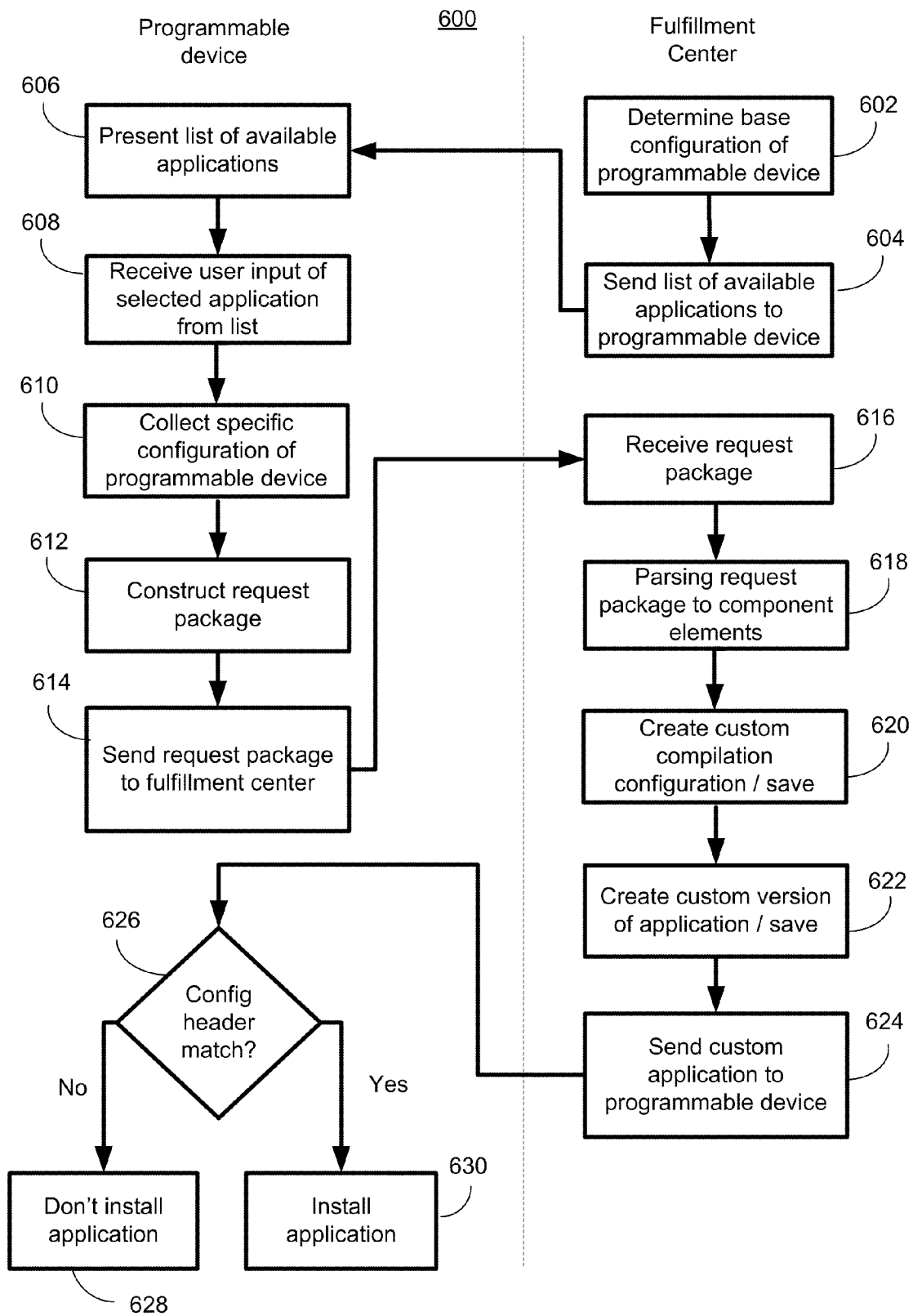
FIG. 6 is a flow chart illustrating a method of creating customized applications.

FIG. 6 is a flow chart of a method 600 of creating customized applications for programmable devices. The method may be particularly applicable to, but not limited to, handheld portable devices. As illustrated in FIG. 6, some steps are performed at a fulfillment center server 208, as depicted to the right of the vertical dashed line, and some steps are performed at a programmable device 202, as depicted to the left of the vertical dashed line.

At block 602, a base configuration of a standard configuration of the programmable device 202 may be determined. That is, a type and version of an operating system running on the programmable device may be made as well as determining a standard screen size in pixels and a color depth. The type of input device may also be collected from information about the most common configuration of the devices as shipped. A currently supported version of the script engine may be determined from a support site, which well may be the fulfillment center server 208. The standard configuration and current versions may be used to develop a list of applications that are supported by at least the standard configuration device. In addition, each application added to the list may also include a catalog of configuration items for which data is desirable in later customization of the application. At block 604, the fulfillment center server 208 may send the list of applications to the programmable device 202.

At block 606, the programmable device 202 may present a user interface with a list of available applications compatible with the base configuration of the programmable device to allow the user to select one of the applications, if desired.

At block 608, the user input may be used to receive input a selection of an application from the list of applications available for installation on the programmable device.

At block 610, in response to receiving the selection, a specific configuration corresponding to the programmable device may be collected. In one embodiment, all available information may be collected, but in another embodiment, only data relevant to that application may be collected. For example, the list of applications received at the programmable device 202 may include a catalog of additional data that describes the configuration data of relevance to that application.

Some elements of configuration that may be checked for presence, version number, size/speed, etc. may include an external light sensor, a motion sensor capability, a camera type, a sound output capability, a peripheral configuration, total and available non-volatile memory, and total volatile memory. Other configuration elements that may be checked and reported are hardware and firmware related to media presentation, in general, playback support. Elements of playback support may include media coder/decoders (CODECs), supported file formats, and transport stream formats (e.g. MPEG2, MPEG4, etc.).

Once the configuration data has been assembled, at block 612, a request package may be constructed at the programmable device. The request package may include component elements of the specific configuration including at least a device identifier, a device type identifier, an identifier of the selected application, a memory configuration, and a script engine version identifier (when present). In some embodiments, a subset of this information, e.g. the programmable device identifier and script engine version number, may be sent in a standard HTTP universal resource locator (URL). For example, in some embodiments, the device identifier or device type identifier may be enough to determine a memory configuration, so that only the minimum required information may need to be included in the request package.

At block 614, the request package may be sent from the programmable device to the fulfillment center server 208.

At block 616 the request package may be received at the fulfillment center server 208. The request package or a portion of it may, optionally, be sent from the fulfillment center to a back end compiler to complete the fulfillment process. In one embodiment, the preparation of a custom application may be prepared at the fulfillment process. In another embodiment, the request is qualified to see if the programmable device type is known by the fulfillment center server 208, that is, if the programmable device is in a database of known programmable devices. If not, the request may be rejected and additional information about its configuration may be requested.

Also at block 616, the fulfillment center server 208 may evaluate the network connection over which the request arrived. The bandwidth of the network may be used as a factor when developing the custom application for the programmable device. When the network is particularly limited in bandwidth, for example, a second generation (2G) or General Packet Radio Service (GPRS) wireless network, the server may include compilation options to reduce the size of the final custom application. Such options may progress over a range of networks capabilities, so that an Enhanced Data rate for GSM Evolution (EDGE) may include more options such as expanded help files, while high speed networks such as HSPDA or WiFi, may include full color graphics, etc.

At block 618, the request package, with the specific configuration of the programmable device 202, may be parsed into the component elements of the request package.

At block 620, a custom compilation configuration may be configured according to elements of the specific configuration of the programmable device. For example, different compiler options to include or exclude add on features or to set default presets in the requested application may be set or cleared. In one embodiment, this process may include creation of a makefile with specific compilation options corresponding to the specific configuration of the programmable device.

At block 622, the custom version of the application may be created by compiling the application using the custom makefile or using the preset compiler options developed at block 620. Both the application and the custom makefile may be saved, using as a retrieval index the elements of the specific configuration. This will allow a request from an identically configured device to be quickly retrieved and sent, although for many reasons, including a large number of configurations, there may be embodiments where no data is saved.

At block 624, the custom application may be sent to the programmable device. Once delivery of the custom application to the programmable device is confirmed, all copies of the custom application from either the back-end compiler or fulfillment center may be deleted. However, as discussed above, in some embodiments, the copies may be cataloged and saved.

In a similar fashion, prior to receiving a given request, common expected component elements may be pre-selected component elements of the request package and used to create a custom application version in accordance with the anticipated component elements, which may then be stored for future custom application requests containing those anticipated component elements. For example, when a new version of a script engine is released, it may be anticipated that future requests will request/require that version of the script engine. Therefore, pre-compiling the common device configurations for support of the new version script engine may save considerable time when new requests come in.

For example, when a request arrives, component elements of the request package may be matched with stored anticipated component elements and the pre-compiled custom application matching those component elements may be sent to the requesting programmable device.

At block 626, after receiving the custom application, a customization header 504 may be examined to verify that selected information corresponding to the component elements used in creating the custom application both match those of the request sent to the fulfillment center 208 and that they are still valid. For example, even if the received package matches the configuration data of the request, a change may subsequently have occurred that materially changes the configuration, such as receipt of a new script engine.

If the customization header 504 does not sufficiently match the current configuration, the 'no' branch from block 626 may be taken to block 628. That is, some elements may not need exactly match, such as free memory, for the match to be successful. In this example, as long as there is sufficient free memory, the match between current configuration and that of the response need not be exact.

At block 628, the application will not be installed or may be deferred and, optionally, the user may be informed of the mismatch, a new request generated and sent, or both. If deferred, the user may be allowed to correct the situation so that the application may be installed, for example, freeing required memory.

If the customization header 504 sufficiently matches the current configuration, the application may be installed by taking the 'yes' branch from block 626 to block 630. At block 630, the application may be verified, if required, and installed and made available to the user for execution.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method comprising:
receiving a request package at a computing device acting as a server, wherein the request package is received from a programmable device and includes component elements of a specific configuration of the programmable device, the component elements including at least:
an identifier of a selected application for installation on the programmable device,
a script engine version identifier identifying a version of a script engine on the programmable device, wherein the version of the script engine is configured to execute multiple different applications including the selected application, and
at least one of a device identifier of the programmable device or a device type identifier of the programmable device;
parsing the request package into the component elements of the request package;
creating a custom version of the selected application based on the component elements of the request package, wherein the custom version of the selected application is executable by the version of the script engine on the programmable device; and
sending the custom version of the selected application from the computing device acting as the server to the programmable device.

2. The method of claim 1, further comprising sending a list of multiple available applications compatible with a base configuration of the programmable device from the computing device acting as the server to the programmable device.

3. The method of claim 1, further comprising:
creating a custom compilation configuration according to the component elements of the specific configuration of the programmable device; and
creating the custom version of the application after receiving the request package by compiling the selected application using the custom compilation configuration.

4. The method of claim 3, wherein:
creating the custom compilation configuration comprises creating a custom makefile with specific compilation options corresponding to the specific configuration of the programmable device, and
creating the custom version of the selected application comprises compiling the application using the custom makefile.

5. The method of claim 1, further comprising:
deleting all copies of the custom version of the selected application from the computing device acting as the server following confirming delivery of the custom version of the application.

6. The method of claim 1, wherein the component elements of the request package identify one or more of:
an external light sensor of the programmable device;
a motion sensor capability of the programmable device;
a camera type of the programmable device;
a sound output capability of the programmable device;
a peripheral configuration of the programmable device;
a total and an available non-volatile memory of the programmable device; or
a total volatile memory of the programmable device.

7. A programmable device comprising:
a processing unit;
a transceiver coupled to the processing unit and configured to support two-way communications;
a memory coupled to the processing unit and storing instructions configured to execute on the processing unit, the instructions configured to implement an operating system, a download system, and a script engine; and
a user interface coupled to the processing unit and supported by the operating system,
wherein the script engine is configured to execute multiple different applications including a custom version of a selected application, and
wherein the download system is configured to:
receive a list of qualified applications via the transceiver,
cause the list to be displayed on the user interface,
receive input from a user related to the selected application,
collect specific configuration information corresponding to a current configuration of the programmable device, the specific configuration information including an identifier of a version of the script engine associated with the current configuration,
send a request for the selected application to a server, the request sent to the server comprising the specific configuration information including the identifier of the version of the script engine associated with the current configuration of the programmable device, and
receive, from the server, the custom version of the selected application, wherein the custom version of the selected application received from the server is executable by the version of the script engine that is associated with the current configuration of the programmable device.

8. The programmable device of claim 7, wherein the download system is further configured to:
examine a customization header of the custom version of the selected application, the customization header containing selected information corresponding to component elements of the specific configuration information used in creating the custom version of the selected application; and
determine whether the customization header matches the current configuration of the programmable device.

9. The programmable device of claim 8, wherein the download system is further configured to:
defer installation of the custom version of the selected application when the customization header does not match the current configuration of the programmable device.

10. The programmable device of claim 8, wherein the download system is further configured to:
install the custom version of the selected application on the programmable device when the customization header matches the current configuration of the programmable device.

11. The programmable device of claim 7, wherein the download system is further configured to:
collect the specific configuration information according to a catalog that identifies desired specific configuration data for the selected application.

12. The programmable device of claim 7, wherein the script engine is further configured to:
interpret the selected application.

13. A server comprising:
a processing unit; and
computer readable instructions which, when executed by the processing unit, configure the processing unit to:
receive, at the server, a request from a programmable device, the request including a set of component elements comprising:
an identifier of a selected application,
a script engine version identifier, and
at least one of a device identifier of the programmable device or a device type identifier of the programmable device,
wherein the script engine version identifier identifies a version of a script engine on the programmable device and the version of the script engine is configured to execute multiple different applications including the selected application;
evaluate individual component elements of the set to identify available options for the selected application;
select one or more option settings for the available options according to the individual component elements;
create a custom version of the selected application using the one or more option settings, wherein the custom version of the selected application is created using at least an individual option setting that is selected based on the version of the script engine on the programmable device and the custom version of the selected application is executable by the version of the script engine on the programmable device; and
send the custom version of the selected application from the server to the programmable device.

14. The server of claim 13, wherein the computer readable instructions, when executed, further configure the processing unit to:
determine a standard configuration of the programmable device;
develop a list of multiple applications that are supported by the standard configuration of the programmable device; and
send the list of multiple applications to the programmable device, wherein the selected application is selected from the list.

15. The server of claim 13, wherein the computer readable instructions further configure the processing unit to:
create the custom version of the selected application using one or more other individual option settings that correspond to:
a screen size and color depth of the programmable device;
a motion sensor capability of the programmable device;
a camera type of the programmable device;
a sound output capability of the programmable device;
a wireless peripheral support capability of the programmable device;
a playback support of the programmable device; or
a memory configuration of the programmable device.

16. The server of claim 13, wherein the computer readable instructions further configure the processing unit to:
evaluate a network type to select the one or more option settings.

17. The server of claim 13, wherein the one or more option settings comprise compiler options or custom include files.

18. The server according to claim 13, wherein the one or more option settings include one or more add-on features in the custom version of the selected application or exclude the one or more add-on features from the custom version of the application.

19. The server according to claim 13, wherein the computer readable instructions further configure the processing unit to:
   pre-compile another version of the selected application for a common device configuration; and
   send the pre-compiled another version of the selected application to another programmable device having the common device configuration.

20. The server according to claim 13, wherein the custom version of the selected application is an applet or executable script.

21. The server according to claim 13, embodied as a general purpose computing device.

* * * * *